US008087893B1

(12) United States Patent
Liang

(10) Patent No.: US 8,087,893 B1
(45) Date of Patent: Jan. 3, 2012

(54) TURBINE BLADE WITH SHOWERHEAD FILM COOLING HOLES

(75) Inventor: George Liang, Palm City, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 420 days.

(21) Appl. No.: 12/418,459

(22) Filed: Apr. 3, 2009

(51) Int. Cl.

| | |
|---|---|
| ***B63H 1/14*** | (2006.01) |
| ***B63H 7/00*** | (2006.01) |
| ***B64C 11/00*** | (2006.01) |
| ***F01D 5/18*** | (2006.01) |
| ***F01D 5/28*** | (2006.01) |
| ***F01D 5/08*** | (2006.01) |
| ***F01D 5/14*** | (2006.01) |
| ***F03D 11/02*** | (2006.01) |
| ***F04D 29/58*** | (2006.01) |

(52) U.S. Cl. ..................... 416/97 R; 416/96 R; 415/115

(58) Field of Classification Search .............. 416/229 R, 416/232

See application file for complete search history.

(56) References Cited

U.S. PATENT DOCUMENTS

| | | | | |
|---|---|---|---|---|
| 6,939,107 | B2 * | 9/2005 | Mongillo et al. | 416/96 R |
| 2003/0068222 | A1 * | 4/2003 | Cunha et al. | 415/115 |
| 2004/0076519 | A1 * | 4/2004 | Halfmann et al. | 416/97 R |

* cited by examiner

*Primary Examiner* — Ha Tran T Nguyen
*Assistant Examiner* — Valerie N Brown
(74) *Attorney, Agent, or Firm* — John Ryznic

(57) ABSTRACT

A turbine rotor blade with a showerhead arrangement of film cooling air for cooling the leading edge of the airfoil, where the film cooling holes each includes a tear drop shaped opening that extends in a radial direction of the airfoil from the film hole breakout and functions to spread out the film layer of cooling air that is ejected from the holes so that a hot streak between holes along the pressure side row and the suction side row of film holes does not occur. The tear drop shaped opening have a shallow depth and include a divider wall extend down the middle to divide the opening.

7 Claims, 3 Drawing Sheets

View A-A

View B-B

TURBINE BLADE WITH SHOWERHEAD FILM COOLING HOLES

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a gas turbine engine, and more specifically to turbine blade exposed to high temperature.

2. Description of the Related Art Including Information Disclosed Under 37 CFR 1.97 and 1.98

A gas turbine engine includes a turbine section with multiple rows or stages of stator vanes and rotor blades that interact or react with a high temperature gas flow to create mechanical power. In an industrial gas turbine (IGT) engine, the turbine rotor blades drive the compressor and an electric generator to generate electrical power.

The efficiency of the engine can be increased by passing a higher temperature gas flow through the turbine. However, the turbine inlet temperature is limited to the vane and blade (airfoils) material properties and the cooling capabilities of these airfoils. The first stage airfoils are exposed to the highest temperature gas flow since these airfoils are located immediately downstream from the combustor. The temperature of the gas flow passing through the turbine progressively decreases as the rotor blade stages extract energy from the gas flow.

The leading edge of the vane and blade airfoils is exposed to the highest temperature gas flow. It is the leading edge region that requires the most cooling capability. In the prior art, various arrangements of film, cooling holes are used on the leading edge region to produce a layer of cooling air that flows over the leading edge surface to protect the metal surface form too much exposure to the high temperature hot gas flow. FIGS. 1 and 2 show a prior art showerhead arrangement of film cooling holes for the leading edge of the airfoil. The showerhead includes a film hole located at a stagnation point 11 along the leading edge, which is the location where the hot gas flow directly hits the airfoil. This is the location of the highest heat load on the leading edge. To each side are a pressure side film hole 12 and a suction side film hole 13 located just downstream from the stagnation point film hole 11. A fourth 14 and fifth 15 film hole is also used and is referred to as gill holes. A pressure side gill hole 14 and a suction side gill hole 15 are both located downstream from the pressure and suction side film holes 12 and 13. Cooling air for the showerhead film holes 11-13 and gill holes 14 and 15 are supplied from an impingement cavity 16 in which the cooling air is metered through metering and impingement holes 17 from a serpentine flow circuit channel 18 located adjacent to the impingement cavity.

FIG. 3 shows a cross section side view of the film holes of the prior art FIG. 1 design. The film holes 11-13 are at an inline pattern and inclined at 20 to 35 degrees toward the blade tip relative to the blade leading edge radial surface 20. Fundamental shortfalls associated with this showerhead design are the over-lapping of film ejection flow in a rotational environment when used on the rotor blades. FIG. 4 shows this film ejection flow discharge in which the film cooling air from the stagnation location hole over-laps with the film cooling air ejected from the pressure side and the suction side film holes. Thus, the space 21 between adjacent pressure side and suction side film holes is left uncovered by film layer which is referred to as the hot streak problem.

BRIEF SUMMARY OF THE INVENTION

It is an object of the present invention to provide for a turbine rotor blade with a showerhead arrangement in which the over-lapping issue, create hot spot problem in-between film holes, of the cited prior art is significantly reduced or eliminated.

It is another object of the present invention to provide for a turbine rotor blade with a showerhead arrangement with a leading edge having a lower metal temperature than the cited prior art rotor blade.

It is another object of the present invention to provide for a turbine rotor blade with a showerhead arrangement with a higher film layer effectiveness than the cited prior art rotor blade.

The turbine rotor blade of the present invention includes film cooling holes that include a tear drop shaped flow spreader with a diverter at the film hole exit for all of the showerhead film hole rows in the spanwise direction of the blade. With the tear drop shaped exit with divider, as the cooling air exits from the blade leading edge showerhead holes, the cooling air will be highly ejected in the radial direction. A portion of the cooling air will migrate into the tear drop flow spreader and then be discharged onto the blade surface to provide additional film cooling layers. As a result of this film cooling holes geometry, the film cooling flow in the tear drop shaped spreader is retained longer and thus increases the showerhead region surface film coverage. This eliminates the hot streak problem in-between film holes and yields a uniform film layer for the blade leading edge region.

DETAILED DESCRIPTION OF THE INVENTION

Figure 1:
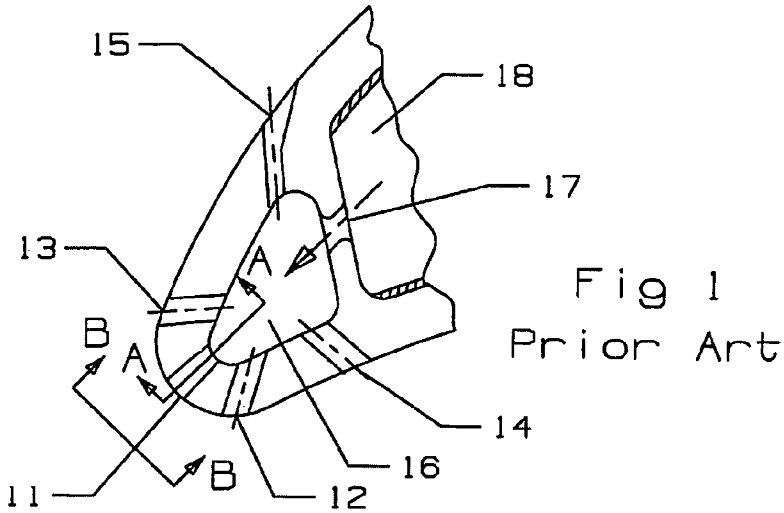
Fig 1 Prior Art
FIG. 1 shows a cross section top view of a showerhead arrangement of film holes for a prior art turbine blade.
Figure 2:
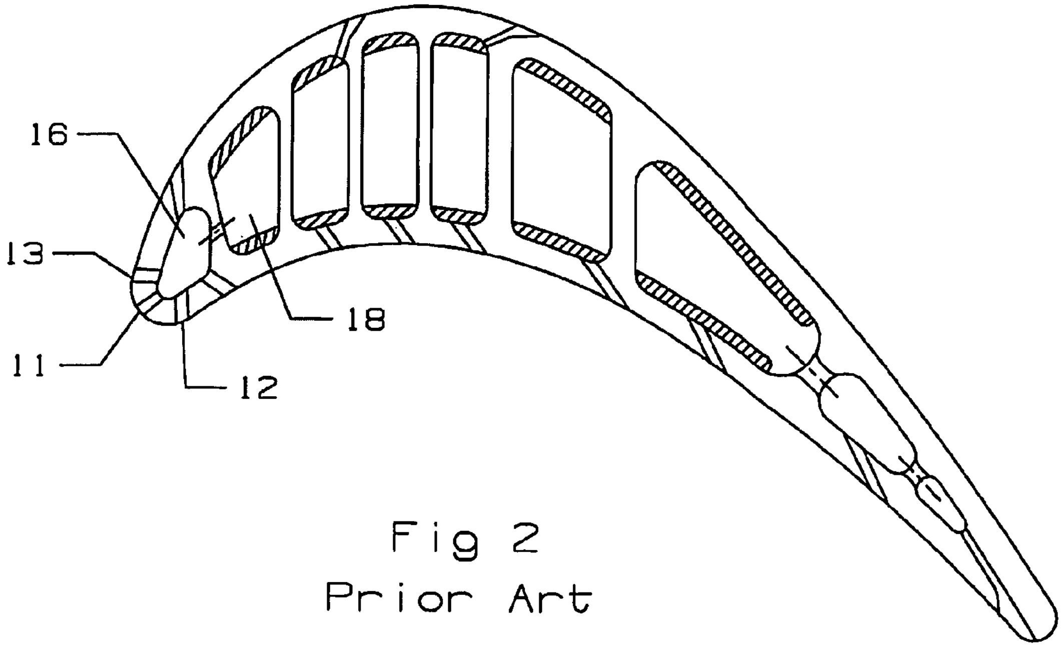
Fig 2 Prior Art
FIG. 2 shows a cross section top view of the prior art turbine blade with the showerhead arrangement of FIG. 1.
Figure 3:
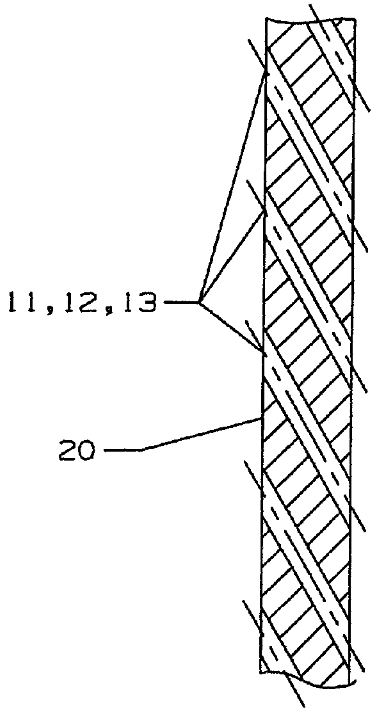
Fig 3 Prior Art
FIG. 3 shows a cross section side view of the prior art turbine blade through line A-A in FIG. 1.
Figure 4:
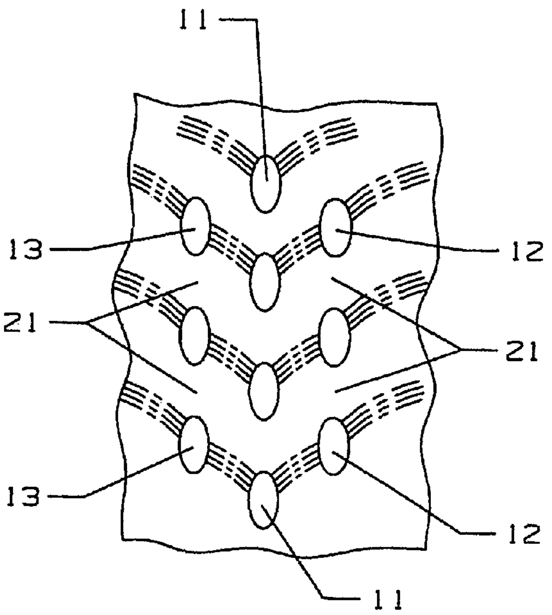
Fig 4 Prior Art
FIG. 4 shows a front view of the showerhead arrangement of film holes with the film layer coverage of the prior art blade of FIG. 2.
Figure 5:
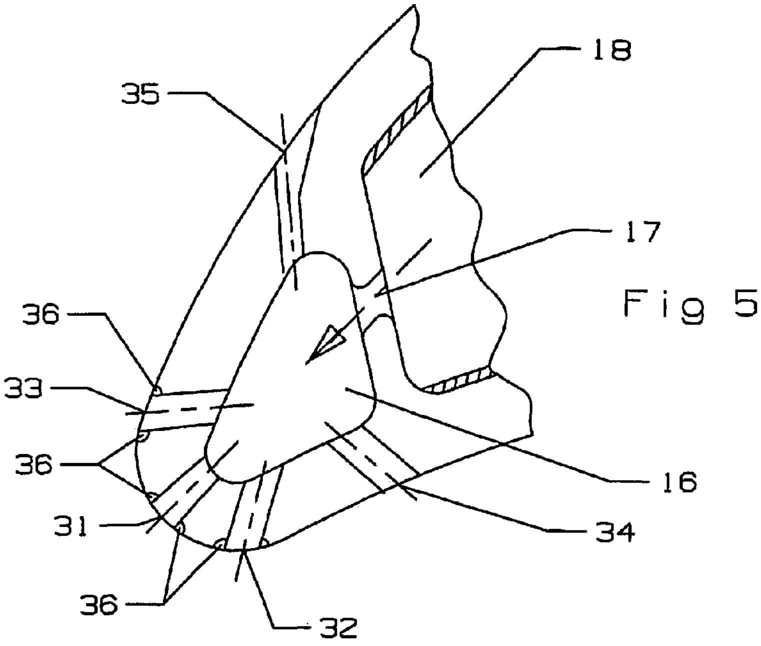
FIG. 5 shows a cross section top view of the showerhead arrangement of the present invention.

The turbine rotor blade of the prior art in FIG. 2 can be adapted for use with the film cooling holes of the present invention. The film cooling holes of the present invention can be use on any rotor blade for cooling of the leading edge region. FIG. 5 shows the showerhead arrangement of the present invention with a stagnation point film hole 31, a pressure side film hole 32 and a suction side film hole 33. Gill holes 34 and 35 are also used on the pressure side and the suction side walls downstream from the showerhead film holes. The cooling air supply channel 18 supplies cooling air to the metering hole 17 which applies impingement cooling to the backside surface of the leading edge, and then discharges the spent impingement cooling air as film layers out through the showerhead film holes 31-33 and the gills holes 34 and 35.

Figure 6:
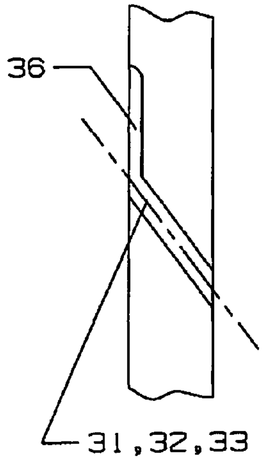
FIG. 6 shows a cross section side view of one of the film holes of the present invention in FIG. 5.
Figure 8:
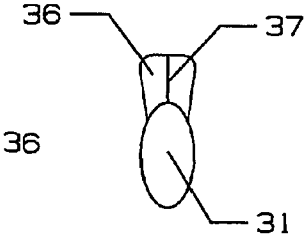
FIG. 8 shows a detailed front view of the film hole of the present invention.

The film cooling holes 31-33 include a tear drop shaped opening 36 on the downstream side of the film hole opening as seen in FIG. 6. FIG. 8 shows a detailed front view of the film cooling hole with the supply hole 31 having a breakout opening into the tear drop shaped opening 36 which has a shallow death of about one half the diameter of the hole 31 (as seen in FIG. 6) and extends in the radial outward direction with a slightly wider downstream end than the upstream end that is connected to the hole 31. The tear drop shaped opening 36 is separated into two sides by a divider wall 37. The tear drop shaped opening functions as a spreader for the cooling air ejecting from the hole 31-33. The film holes that open into the tear drop shaped opening are referred to as the hole breakout.

Figure 7:
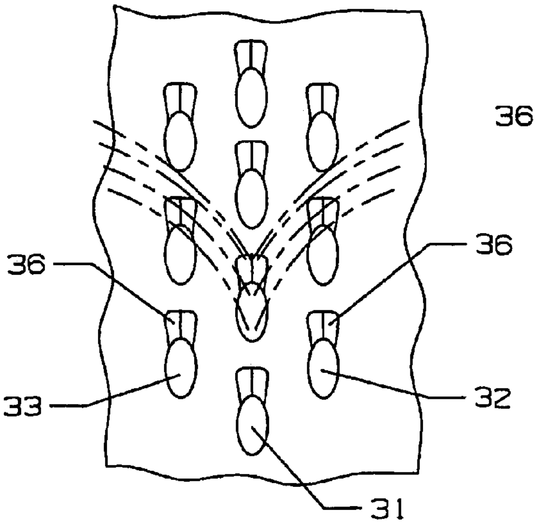
FIG. 7 shows a front view of the showerhead arrangement of film holes of the present invention with the film coverage.

As the cooling air is ejected from the hole 31, the cooling air is highly ejected in a radial direction of the airfoil. A portion of the cooling air will thus migrate into the teat drop shaped opening—which functions as a flow spreader—and then discharges the cooling air onto the leading edge surface to provide additional layer of film cooling air. As a result of this tear drop shaped opening, the film cooling layer discharged from the hole will retain the film layer flow longer than in the above prior art film hole and therefore increase the showerhead region surface film coverage. FIG. 7 shows the film coverage of the showerhead film cooling holes with the tear drop shaped opening. The prior art hot streaks that occur in the prior art—the space formed between film holes in the pressure side row or the suction side row—is covered with a film layer discharged from the stagnation point film holes 31 of the present invention. This extra film layer coverage will eliminate the hot streak issue between film holes in the row of the prior art and yield a uniform film layer for the blade leading edge region.

I claim the following:

1. An air cooled turbine rotor blade comprising:

an airfoil having a leading edge with a pressure side wall and suction side wall extending from the leading edge;

an impingement cavity formed along the leading edge region;

a cooling air supply channel located adjacent to the leading edge impingement cavity and connected to the leading edge impingement cavity by at least one metering hole;

a showerhead arrangement of film cooling holes connected to the impingement cavity; and, the film cooling holes located along the stagnation point each having a tear drop shaped opening on the downstream side of the film hole to spread the film layer of cooling air ejected from the film hole.

2. The air cooled turbine rotor blade of claim 1, and further comprising:

the tear drop shaped opening has a depth of around one half the diameter of the film hole leading into the tear drop shaped opening.

3. The air cooled turbine rotor blade of claim 1, and further comprising:

the tear drop shaped opening has a radial length of more than the radial length of the film hole breakout into the tear drop shaped opening.

4. The air cooled turbine rotor blade of claim 1, and further comprising:

the tear drop shaped opening includes a divider wall located at around the mid-point of the tear drop shaped opening.

5. The air cooled turbine rotor blade of claim 1, and further comprising:

the tear drop shaped opening has an increasing width in the downstream direction.

6. The air cooled turbine rotor blade of claim 1, and further comprising:

the tear drop shaped opening of the stagnation point film holes is shaped and located with respect to the pressure side and suction side film holes so that no hot streak exists between holes in the pressure side and suction side rows of film holes.

7. The air cooled turbine rotor blade of claim 1, and further comprising:

the pressure side and the suction side film cooling holes also include a tear drop shaped opening that extends in the radial direction of the airfoil.

* * * * *